United States Patent
Kainuma et al.

(10) Patent No.: US 7,471,081 B2
(45) Date of Patent: Dec. 30, 2008

(54) SLIDER TESTER

(75) Inventors: Norio Kainuma, Kawasaki (JP); Kenji Kobae, Kawasaki (JP); Hidehiko Kira, Kawasaki (JP); Hiroshi Kobayashi, Kawasaki (JP); Shuichi Takeuchi, Kawasaki (JP); Takayoshi Matsumura, Kawasaki (JP); Hirokazu Yamanishi, Kawasaki (JP); Shinji Hiraoka, Kawasaki (JP); Yoshiaki Yanagida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 11/326,598

(22) Filed: Jan. 6, 2006

(65) Prior Publication Data

US 2006/0172575 A1 Aug. 3, 2006

Related U.S. Application Data

(63) Continuation of application No. PCT/JP03/08880, filed on Jul. 11, 2003.

(51) Int. Cl.
*G01R 33/12* (2006.01)
(52) U.S. Cl. .................. 324/210; 324/262
(58) Field of Classification Search ............. 324/210, 324/212, 262; 360/255.1–255.9, 250; 369/244.1
See application file for complete search history.

(56) References Cited

U.S. PATENT DOCUMENTS

| 3,896,495 | A  | * | 7/1975 | Beecroft ............ 360/244.2 |
| 6,943,971 | B2 | * | 9/2005 | Kainuma et al. ........ 360/31 |

FOREIGN PATENT DOCUMENTS

| JP | 8-106745   | 4/1996 |
| JP | 11-265557  | 9/1999 |
| JP | 2003-36624 | 2/2003 |

* cited by examiner

*Primary Examiner*—Patrick J Assouad
*Assistant Examiner*—David M. Schindler
(74) *Attorney, Agent, or Firm*—Kratz, Quintos & Hanson, LLP

(57) ABSTRACT

A slider tester includes a driving unit that rotates a test medium, a set plate that detachably supports a slider as a single body, and an investigating apparatus that is electrically connected to the slider supported by the set plate and investigates the characteristics of the slider. A movable support part 30 that tiltably supports the slider is provided on the set plate. There is also provided a pressing mechanism that elastically presses the slider via the movable support part toward a surface of the medium to dispose the slider floating over the surface of the medium. The pressing mechanism includes an elastic body 56 composed of a plate spring that contacts the movable support part and elastically presses the movable support part.

1 Claim, 5 Drawing Sheets

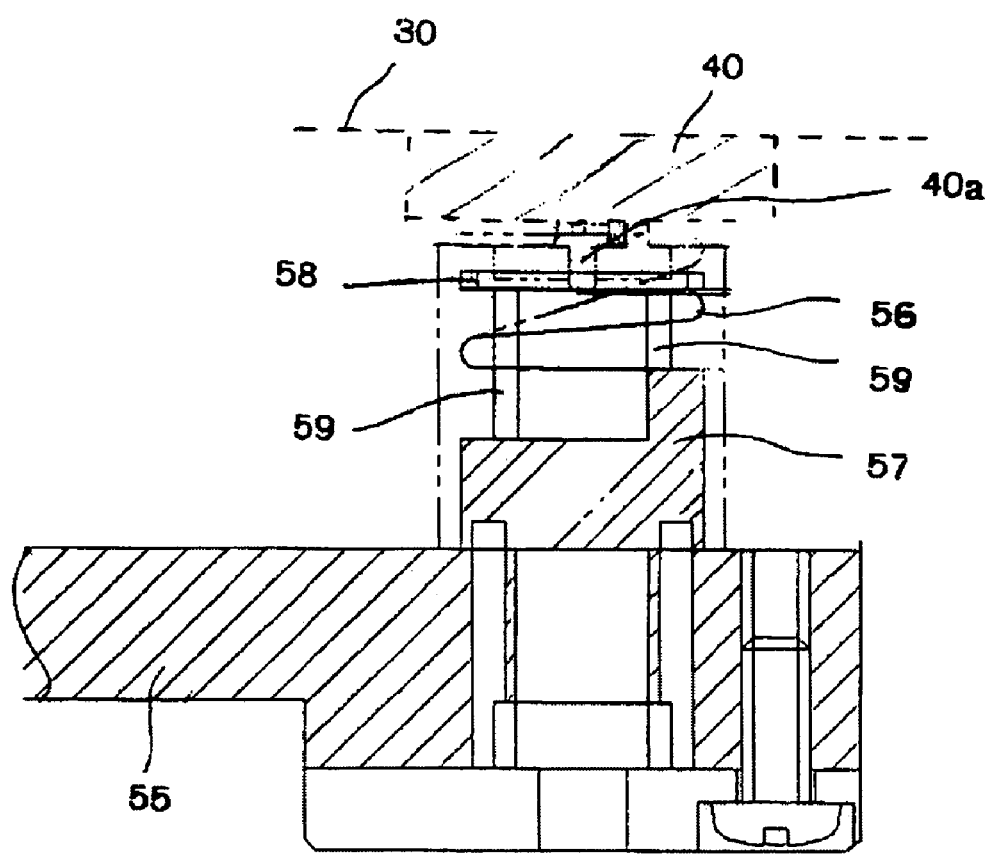

PRIOR ART

SLIDER TESTER

This application is a continuation of international application PCT/JP03/08880 filed Jul. 11, 2003.

TECHNICAL FIELD

The present invention relates to a slider tester that tests the characteristics of a slider (magnetic head) used to read/write data on a medium such as a magnetic disk.

BACKGROUND ART

A slider (magnetic head) used to read/write data on a medium such as a magnetic disk is installed in an actual device after rotating a medium and testing the float characteristics above the medium surface and a read/write function for data on the medium. Conventionally, the functions of a slider have been tested by installing the slider on a suspension to form a slider assembly and setting the slider assembly in a tester.

However, when the fraction defective for sliders is high, the suspension will be discarded together with the slider, and therefore there is the problem that the manufacturing cost of the suspension and the cost of assembling the slider assembly are wastefully incurred in addition to the manufacturing cost of the slider. For this reason, a method of testing the functions of a slider as a single body before mounting on a suspension and mounting only non-defective sliders on suspensions has been considered.

FIG. 7 shows an example construction of a slider tester for testing the characteristics of a slider as a single body. Reference numeral 10 designates the tester main body of the slider tester. The tester main body 10 includes a driving unit that rotates a test medium 12 in the same way as in an actual device, a movement control unit for moving the medium 12 to a test position where a slider is set, and an investigation apparatus for investigating the data read/write characteristics for the combination of the medium 12 and the slider at the test position.

The slider tester in the illustrated example is provided with setting units where sliders 14 that are the tested products are set at four corners of the upper surface of the tester main body 10. The setting units respectively include a set plate 20 that supports a slider 14, an arm part 22 that supports the set plate 20, and a mounting base 24 that supports the arm part 22.

The medium 12 is supported on a spindle 13 so that the medium surface is horizontal. The spindle 13 is provided so as to be movable from one side of the tester main body 10 to the other, and by moving the medium 12 supported by the spindle 13 from one side of the tester main body 10 to the other, it is possible to test the respective sliders 14 set on the set plates 20.

FIG. 8 shows a slider attaching construction for attaching a slider 14 onto a set plate 20. The set plate 20 includes a ring spring 30 for supporting the slider 14 in a floating state with respect to the surface of the medium 12, a socket 40 for detachably supporting the slider 14, and a pressing mechanism 50 for elastically pressing the socket 40 to apply a predetermined load to the slider 14. It should be noted that the ring spring 30 and the socket 40 construct a movable support part that can movably support the slider 14.

In a state where the slider 14 is supported by the socket 40, the ring spring 30 supports the slider 14 so that the slider 14 can be tilted in freely chosen directions (in a pitching direction and in a rolling direction). The ring spring 30 is formed by providing arc-shaped slits in a thin metal plate so that the slider 14 can be tilted in the freely chosen directions. The socket 40 is joined to a lower surface of a setting part 34 formed in the center of the ring spring 30. A contact block 42 and a pressing spring 48 that faces the contact block 42 are provided on the upper surface of the socket 40. By elastically pressing the slider 14 toward the contact block 42 using the pressing spring 48, the slider 14 is set with the terminals of the slider 14 pressed into contact with contact terminals provided on the contact block 42. The contact terminals of the contact block 42 are electrically connected to the investigating apparatus via a wiring pattern provided on the ring spring 30 and the electrical characteristics of the slider 14 are measured.

The pressing mechanism 50 includes a pressing pin 51 disposed below the socket 40 and a coil spring 52 provided so as to push out the pressing pin 51. The coil spring 52 causes an upper end surface of the pressing pin 51 to contact a lower surface of the socket 40 to elastically press the slider 14 supported on the ring spring 30 toward the medium surface. By adjusting the energizing force of the coil spring 52, it is possible to adjust the load that acts on the slider 14 and therefore the float of the slider 14 with respect to the medium surface can be adjusted.

By doing so, it is possible to set the sliders 14 on the set plates 20, to cause the sliders 14 to float with respect to the medium in a state where the test medium is rotated, and to carry out read/write tests for data. According to this slider tester, it is possible to test the characteristics of sliders as single bodies before mounting on a suspension, and therefore it is possible to avoid the wasted manufacturing cost and assembly cost described above.

However, in the slider tester according to the construction described above, since the pressing spring is fabricated using a metal plate spring, there has been the problem of the spring being susceptible to deterioration and the problem that it is not possible to replace the pressing spring without dismantling the assembled components.

In addition, sliding resistance is produced by the pressing mechanism guiding the pressing pin, and therefore there has been the problem that the load applied to the slider fluctuates and the floating posture of the slider becomes unstable.

The present invention was conceived to solve the problems described above and it is an object of the present invention to provide a highly reliable slider tester that is easier to maintain due to the pressing plate being easily replaceable, that can prevent fluctuations in the load that acts on the slider, and that can correctly test a slider as a single body.

DISCLOSURE OF THE INVENTION

To achieve the stated object, a slider tester according to the present invention includes a driving unit that rotates a test medium, a set plate that detachably supports a slider as a single body, and an investigating apparatus that is electrically connected to the slider supported by the set plate and investigates the characteristics of the slider, wherein a movable support part that tiltably supports the slider is provided on the set plate and a pressing mechanism that elastically presses the slider via the movable support part toward a surface of the medium to dispose the slider floating over the surface of the medium is provided, and wherein the pressing mechanism includes an elastic body composed of a plate spring that contacts the movable support part and elastically presses the movable support part.

Another slider tester includes a driving unit that rotates a test medium, a set plate that detachably supports a slider as a single body, and an investigating apparatus that is electrically connected to the slider supported by the set plate and investigates the characteristics of the slider, wherein a movable support part that tiltably supports the slider is provided on the set plate, and a pressing mechanism including a pressing pin that contacts the movable support part and elastic means that elastically presses the slider via the pressing pin toward a surface of the medium to dispose the slider floating over the surface of the medium is provided, and wherein an ultrasonic generator that reduces the sliding resistance of the pressing pin is attached to the pressing mechanism.

Yet another slider tester includes a driving unit that rotates a test medium, a set plate that detachably supports a slider as a single body, and an investigating apparatus that is electrically connected to the slider supported by the set plate and investigates the characteristics of the slider, wherein a movable support part that tiltably supports the slider is provided on the set plate, and a socket for setting the slider is provided on the movable support part and a pressing spring that supports the slider is detachably provided on the socket.

BRIEF DESCRIPTION OF THE DRAWINGS

FIG. 5 is a diagram useful in explaining the construction of the pressing mechanism that uses an elastic body composed of a plate spring;

BEST MODE FOR CARRYING OUT THE INVENTION

Figure 7:
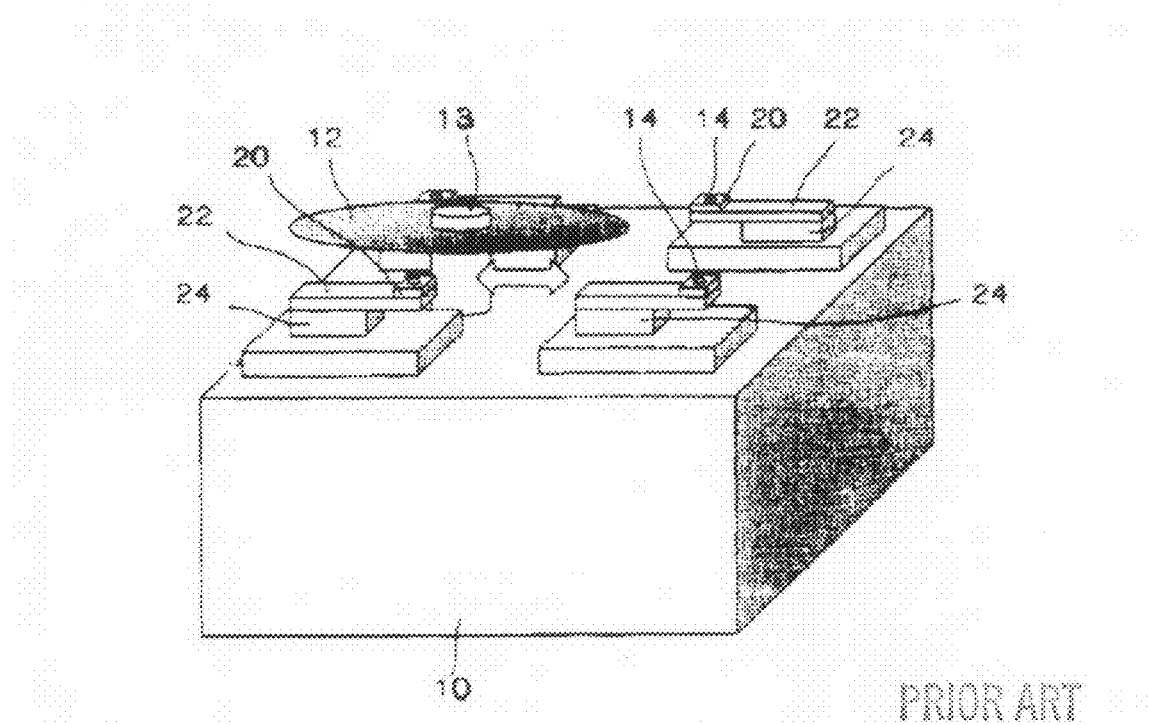
FIG. 7 is a diagram useful in explaining the overall construction of a slider tester.
Figure 8:
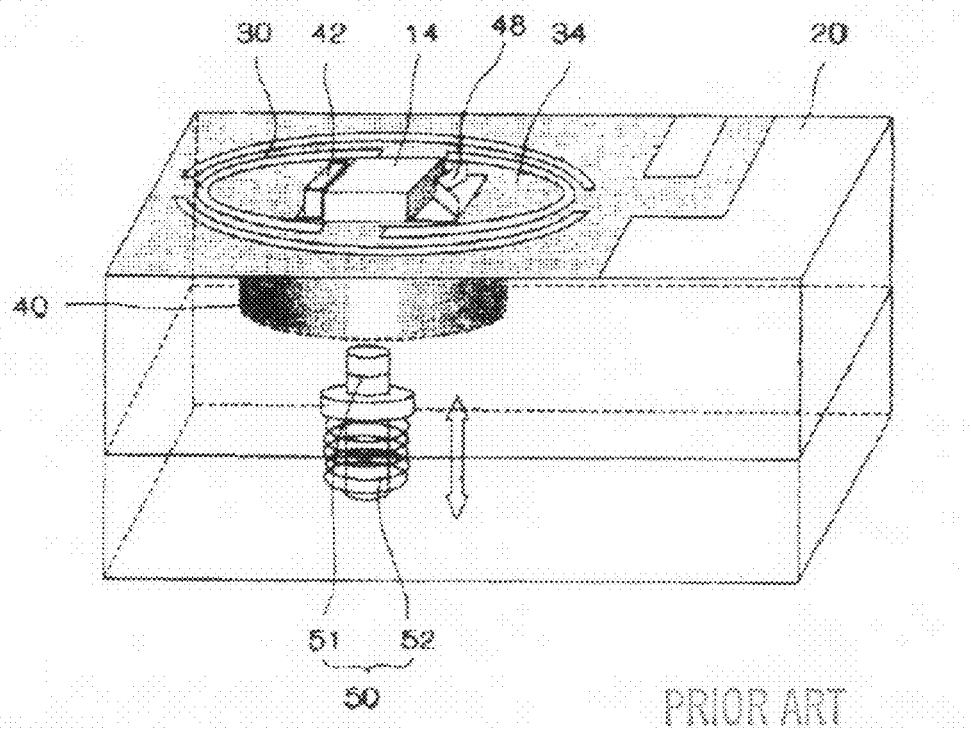
FIG. 8 is a diagram useful in explaining an attaching construction of a set plate for attaching a slider.

Preferred embodiments of the present invention will now be described in detail with reference to the attached drawings. It should be noted that the overall construction of the slider tester and the construction of the set plate for setting a slider according to the present invention are fundamentally the same as the constructions of the slider tester and the set plate shown in FIGS. 7 and 8. Accordingly, descriptions of such constructions are omitted.

Socket Construction

FIG. 1 shows constructions of a socket 40 and a pressing spring 48 in the slider tester according to the present invention. The present embodiment is characterized by the pressing spring 48 being detachably provided on the socket 40.

Figure 1A:
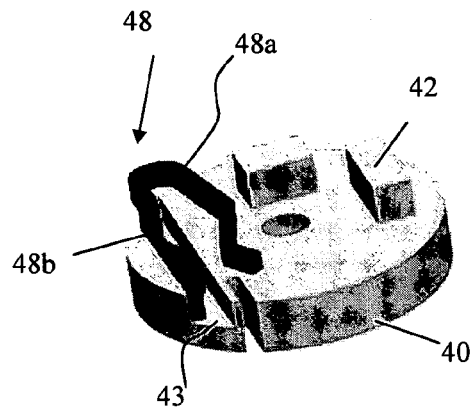
FIGS. 1A and 1B are perspective view showing constructions of a pressing spring and a socket.

FIG. 1A is an example where an attachment groove 43 for attaching a pressing spring 48 is provided in the upper surface of the socket 40 on which the slider 14 is set, so that the pressing spring 48 can be detachably attached to the attachment groove 43. The pressing spring 48 is formed in a U-shape, with one spring arm being used as a pressing arm 48a that presses the slider 14 and the other spring arm being used as an attachment arm 48b that is fitted into the attachment groove 43. In the present embodiment, the attachment arm 48b is formed in a wave-like shape and by fitting the attachment arm 48b into the attachment groove 43 that is formed in a straight shape, the pressing spring 48 is fixed to the socket 40 by the elastic force of the attachment arm 48b.

Due to the attachment groove 43 being formed, the upper surface of the socket 40 has a stepped shape, and therefore the thickness (the length in the depth direction for fitting into the attachment groove 43) of the attachment arm 48b of the pressing spring 48 is set larger than the thickness of the pressing arm 48a, and when the attachment arm 48b has been fitted into the attachment groove 43, the pressing arm 48a is positioned on the upper surface of the socket 40 at a location facing the contact block 42.

Figure 1B:
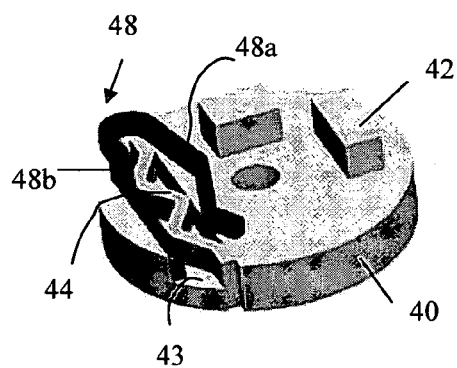

FIG. 1B shows an example where instead of forming the attachment arm 48b of the pressing spring 48 in a wave-like shape, the attachment arm 48b is formed in a straight shape and an elastic pressing part 44 in a wave-like shape is provided in the attachment groove 43 formed in the socket 40. When the attachment arm 48b of the pressing spring 48 is fitted into the attachment groove 43, the attachment arm 48b is elastically sandwiched by the elastic pressing part 44a to fix the pressing spring 48 to the socket 40.

In this way, by using a construction where the pressing spring 48 is detachably attached to the attachment groove 43 provided in the socket 40, when the pressing spring 48 has deteriorated due to repeated use, it is possible to replace only the pressing spring 48. Also, when replacing the pressing spring 48, it is not necessary to dismantle the assembled components, which makes it easy to replace the pressing spring 48.

Construction of Unload Bar

When testing a slider 14 using the slider tester according to the present invention, the slider 14 that is the tested product is set on the set plate 20, the slider 14 is brought close to the surface of the test medium 12 in a state where the medium 12 is rotated and after carrying out a test with the slider 14 floating over the surface of the medium 12, the slider 14 is withdrawn from the medium 12, and a slider 14 that is the next tested product is set on the set plate 20.

During such operations, when the slider 14 is withdrawn from the medium 12, the pressure between the slider 14 and the medium 12 becomes negative, thereby causing an action whereby the slider 14 is pulled toward the medium. Although there is no problem when the ring spring 30 has high rigidity, if the ring spring 30 has low rigidity, when the slider 14 is withdrawn from the medium 12, the ring spring 30 is pulled toward the medium together with the slider 14, resulting in the problem of the ring spring 30 deforming. When suppressing the float amount of the slider 14, it is necessary to set the rigidity of the ring spring 30 low, and in this case the ring spring 30 becomes susceptible to deformation.

Figure 2:
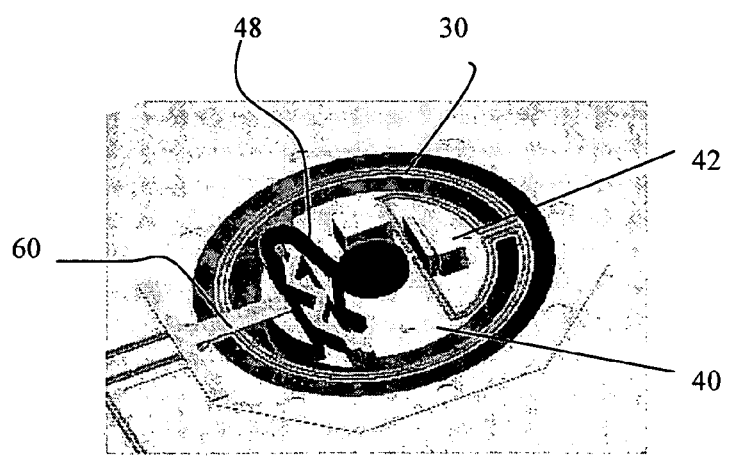
FIG. 2 is a diagram useful in explaining the construction of an unload bar.

FIG. 2 shows an example which is constructed to prevent such deformation of the ring spring 30 by inserting a T-shaped unload bar 60 between the medium 12 and the ring spring 30 when the slider 14 is withdrawn from the surface of the medium 12. By providing this type of unload bar 60, when the slider 14 is withdrawn from the medium 12, the unload bar 60 contacts the surface of the ring spring 30 and the slider 14 is withdrawn from the medium while the ring spring 30 is being pressed with the unload bar 60, so that even if the rigidity of the ring spring 30 is low, the slider 14 can still be withdrawn without the ring spring 30 deforming.

Construction of the Pressing Mechanism

FIG. 3 shows constructions for the pressing mechanism 50 of the slider tester according to the present invention. The pressing mechanism 50 includes a pressing pin 51 that contacts a lower surface of the socket 40 and a coil spring 52 that elastically presses the pressing pin 51 toward the medium 12.

Figure 3A:
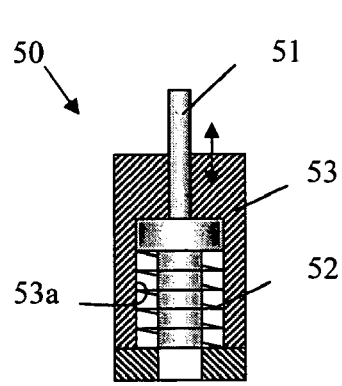
FIGS. 3A and 3B are diagrams showing the constructions of pressing mechanisms.

FIG. 3A shows a construction where the pressing pin 51 is supported so as to be slidable in an axial direction thereof by a support block 53. The pressing pin 51 is housed in a slide hole 53a provided in the support block 53 so as to be slidable in the axial direction.

The pressing pin 51 presses the slider 14 via the socket 40 toward the surface of the medium 12 and should preferably have the lowest possible sliding resistance so that there is no shaft vibration when moving in the axial direction. When the clearance between the pressing pin 51 and the slide hole 53a is large, although there is little sliding resistance, there is the problem that the pressing pin 51 will vibrate during testing. Also, since the pressing force (load) that acts on the slider 14 is extremely small at around 1.5 g, when a large sliding resistance acts on the pressing pin 51, the predetermined pressing force will no longer act on the slider 14.

Figure 3B:
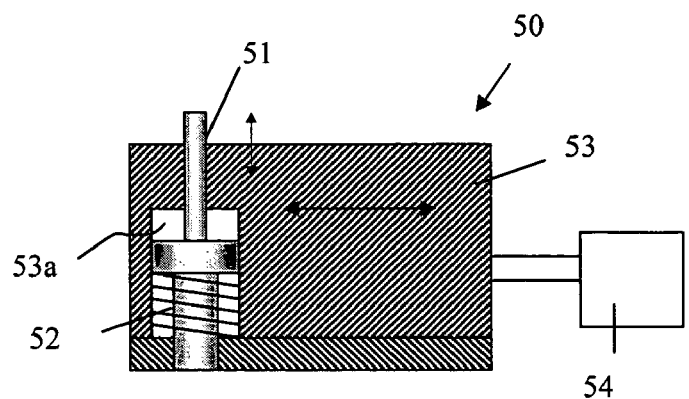

FIG. 3B shows an example construction where the clearance between the slide hole 53a provided in the support block 53 and the pressing pin 51 is reduced to prevent shaft vibration of the pressing pin 51 and an ultrasonic generator 54 is placed in contact with the support block 53 and the support block 53 is caused to ultrasonically vibrate with a small amplitude of around 1 μm or less to reduce the sliding resistance of the pressing pin 51. According to the embodiment shown in FIG. 3B, even if the clearance is set for the slide hole 53a provided in the support block 53 at a value where the pressing pin 51 does not slide due to the elastic force of the coil spring 52, it is possible to reduce the sliding resistance of the pressing pin 51 using the ultrasonic vibration and therefore it becomes possible to achieve the conflicting aims of preventing shaft vibration of the pressing pin 51 and reducing the sliding resistance.

The pressing pin 51 is an extremely small component, and therefore for machining reasons it is difficult to use a construction where the sliding resistance is reduced by disposing a bearing on the sliding part. The construction of the present embodiment is effective in that the desired action can be obtained by machining the pressing pin 51 and the slide hole 53a formed in the support block 53 with high precision.

Figure 4:
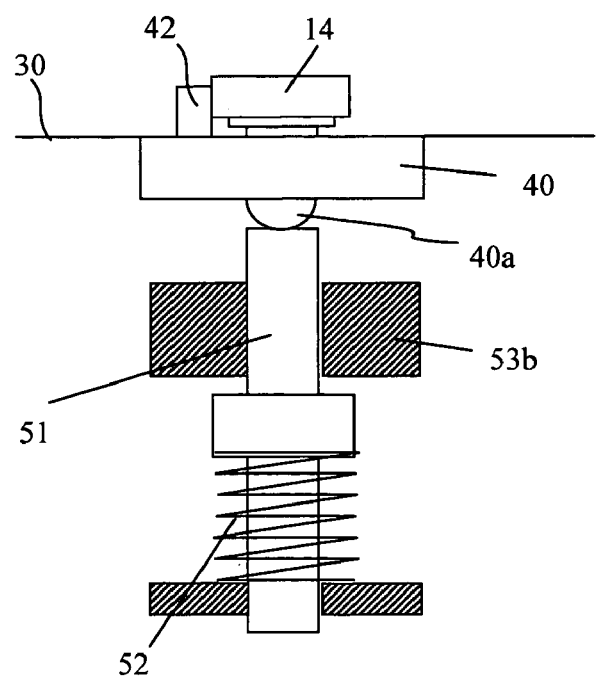
FIG. 4 is a diagram useful in explaining the arrangement of the pressing mechanism and the socket.

FIG. 4 shows an example construction where the upper end surface of the pressing pin 51 is a flat surface, a hemispherical protruding part 40a is provided on a lower surface of the socket 40 facing the upper end surface of the pressing pin 51, and the energizing force of the coil spring 52 acts on the socket 40 by having the pressing pin 51 contact the protruding part 40a.

In the pressing mechanism shown in FIG. 4, the pressing pin 51 is guided in the axial direction by a guide bushing 53b. In the same way as the pressing mechanism shown in FIG. 3, the pressing pin 51 is guided by the slide hole 53a and the guide bushing 53b, thereby preventing sliding resistance from acting on the pressing pin 51.

FIG. 5 shows another example construction of the pressing mechanism, and is an example construction where the pressing pin 51, the coil spring 52, and the convex part 53b are not used and instead an elastic body 56 composed of a plate spring is provided between a base plate 55 and the socket 40, with the elastic body 56 being placed in direct contact with the socket 40. In the embodiment shown in FIG. 5, an elastic body 56 formed by folding a plate spring in a Z shape is used. Reference numeral 57 designates a support body that supports an end part of the elastic body 56, reference numeral 58 a preloading stopper, and 59 a stopper guide.

The preloading stopper 58 holds the elastic body 56 in an already-compressed state and is used to preadjust the load applied to the slider 14. By adjusting the position of the preloading stopper 58 to apply a preload to the elastic body 56, it is possible to have a load that matches the floating rigidity of the slider 14 act upon the slider 14 when the elastic body 56 contacts the socket 40. By merely guiding the preloading stopper 58 using the stopper guide 59, the elastic body 56 composed of a plate spring does not contact the stopper guide 59. Accordingly, the elastic body 56 that presses the socket 40 is completely free from the stopper guide 59 and the like, and no sliding resistance at all acts when a load is placed upon the socket 40.

That is, according to the construction of the pressing applying mechanism of the present embodiment, the elastic force acts on the slider 14 from the elastic body 56 without being affected, and therefore the float characteristics of the slider 14 in a state where the slider 14 is mounted as a single body in a slider tester can be obtained as conditions that are extremely close to the float characteristics in a state where the slider is mounted on a suspension.

It should be noted that since the preloading stopper 58 adjusts the elastic force that acts on the slider 14 from the elastic body 56 according to the attachment position of the preloading stopper 58 on the stopper guide 59, when the preload pressure is adjusted, it is necessary to pay sufficient attention to the manufacturing tolerances of the respective components. That is, it is necessary to set the dimensional tolerances of the mounting position of the preloading stopper 58 and the like so that the preload can be adjusted to a predetermined preload value.

FIG. 6 shows other examples of an elastic body 56 formed using a plate spring. FIG. 6A shows an example where the elastic body 56 uses a plate spring and is shaped like an oval when viewed from the front. A straight part 56a on an upper side of the elastic body 56 shaped like an oval contacts the socket 40 and therefore an elastic force acts on the slider 14 from the elastic body 56. By attaching a preloading stopper to the stopper guide 59 and changing the degree of curvature of the elastic body 56, the preload value of the elastic body 56 can be adjusted.

Figure 6A:
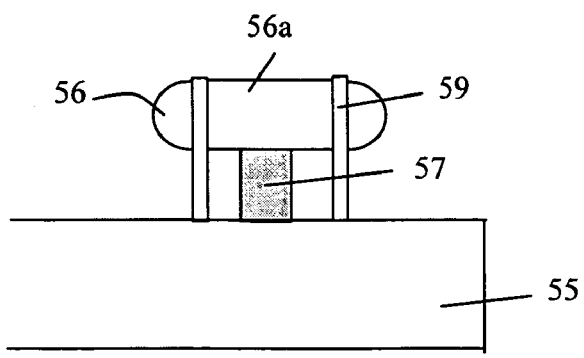
FIGS. 6A to 6D are diagrams useful in explaining examples of elastic bodies used in the pressing mechanism.
Figure 6B:
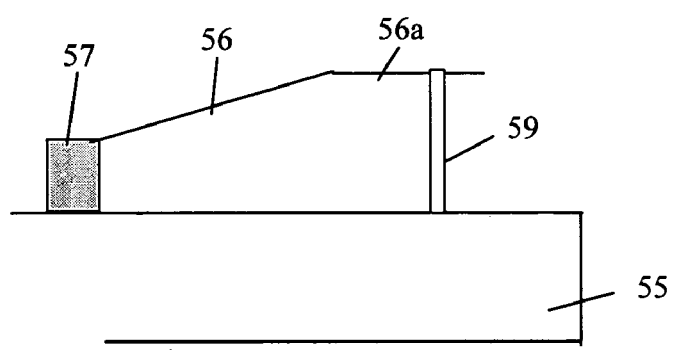

FIG. 6B shows a construction where the end part of a plate spring is curved to produce the elastic body 56 and the elastic body 56 is cantilevered on the support body 57. By forming the elastic body 56 in a shape where a plate spring extends a long way, the end part of the plate spring that is shaped so as to be flat is provided so as to move up and down in parallel. In this embodiment also, by providing a preloading stopper on the stopper guide 59, it is possible to apply a preload to the elastic body 56.

Figure 6C:
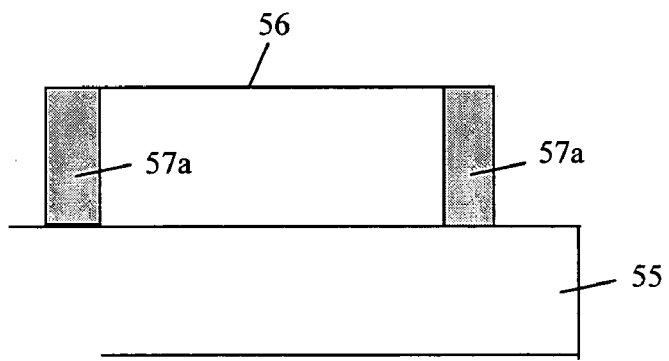
Figure 6D:
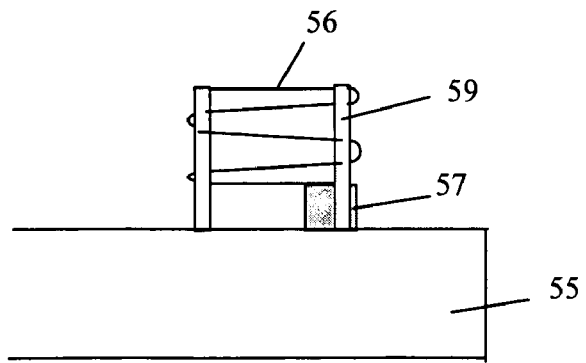

FIG. 6C shows a construction where an elastic body 56 composed of a plate spring formed in a straight line is held at both ends by a pair of support bodies 57a, 57b. FIG. 6D shows a construction where an elastic body 56 is produced by bending a plate spring into a wave shape.

The direction in which the elastic body 56 shown in the respective embodiments becomes displaced is always a direction that makes the slider 14 perpendicular to the surface of the medium 12, which is favorable for the load that acts on the slider 14.

It should be noted that when controlling the clearance between the surface of the medium 12 and the slider 14, a position (origin position) where the socket 40 contacts the elastic body 56 is used as a reference position, and control is carried out to set the clearance between the surface of the medium 12 and the slider 14 at the float gap. However, in reality, there are cases where the slider 14 is supported more stably by pressing the slider 14 closer to the surface of the medium 12 than the origin position. When controlling the position of the slider 14 with respect to the surface of the medium 12 by setting a "pressing-in margin" in this way, it is necessary to set the position of the preloading stopper 58 and the preload value with consideration to such margin.

In this way, with a method that applies a load to the slider 14 using the elastic body 56, unlike when a pressing pin 51 is used, no sliding resistance at all is caused and therefore the method can be effectively used when the float amount of the slider 14 is adjusted using an extremely small load. It should be noted that when the elastic body 56 is formed using a plate spring, it is necessary to adjust and use the elastic body 56 with consideration to the elastic force and the like produced due to the spring constant of the plate spring and the compression amount of the plate spring so as to obtain a suitable load for the float rigidity of the slider 14.

The invention claimed is:

1. A slider tester comprising a driving unit that rotates a test medium, a set plate that detachably supports a slider as a single body, and an investigating apparatus that is electrically connected to the slider supported by the set plate and investigates the characteristics of the slider, wherein a movable support part that tiltably supports the slider is provided on the set plate, and a socket for setting the slider is provided on the movable support part and a pressing spring that supports the slider is detachably provided on the socket, and wherein the pressing spring is formed in a U shape including a pressing arm that supports the slider by pressing the slider against a contact block provided on the socket and an attachment arm that is fitted into an attachment groove provided in the socket.

* * * * *